US011040460B2

United States Patent
Saho

(10) Patent No.: US 11,040,460 B2
(45) Date of Patent: Jun. 22, 2021

(54) CUTTING APPARATUS FOR MEMBRANE ELECTRODE AND GAS DIFFUSION LAYER ASSEMBLY

(71) Applicant: TOYOTA JIDOSHA KABUSHIKI KAISHA, Toyota (JP)

(72) Inventor: Isamu Saho, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 23 days.

(21) Appl. No.: 16/256,164

(22) Filed: Jan. 24, 2019

(65) Prior Publication Data
US 2019/0240856 A1    Aug. 8, 2019

(30) Foreign Application Priority Data
Feb. 6, 2018 (JP) .............................. JP2018-019442

(51) Int. Cl.
*B26F 1/44* (2006.01)
*B26D 7/01* (2006.01)
*H01M 8/1004* (2016.01)

(52) U.S. Cl.
CPC .............. *B26D 7/015* (2013.01); *B26F 1/44* (2013.01); *H01M 8/1004* (2013.01)

(58) Field of Classification Search
CPC .. B26D 7/015; B26F 1/44; B26F 1/40; H01M 8/1004
See application file for complete search history.

(56) References Cited

U.S. PATENT DOCUMENTS

| 4,730,761 A * | 3/1988 | Spano ................. B26D 7/1863 225/103 |
| 7,011,004 B2 * | 3/2006 | Ishii .................... H01M 4/8605 83/24 |
| 8,741,085 B2 * | 6/2014 | Anspach ............ B29C 67/0044 156/222 |
| 2006/0150795 A1 * | 7/2006 | Mochizuki .............. B26D 5/14 83/669 |
| 2011/0041989 A1 | 2/2011 | Anspach et al. |

FOREIGN PATENT DOCUMENTS

| EP | 3109018 A1 * | 12/2016 | ............ B65B 61/28 |
| JP | 2009-208124 A | 9/2009 | |
| JP | 2013-178993 A | 9/2013 | |
| JP | 2014-037010 A | 2/2014 | |

\* cited by examiner

*Primary Examiner* — Stephen Choi
(74) *Attorney, Agent, or Firm* — Dickinson Wright, PLLC

(57) ABSTRACT

A cutting apparatus for a membrane electrode and gas diffusion layer assembly included in a fuel cell includes an upper die, a lower die, and a workpiece holder, and the workpiece holder is arranged such that a workpiece holding distance between a first outer lateral surface of the lower die, the first outer lateral surface facing the workpiece holder, and a second outer lateral surface of the workpiece holder is 5 times to 12 times a thickness of the workpiece.

4 Claims, 7 Drawing Sheets

FIG. 1A
CONVENTIONAL
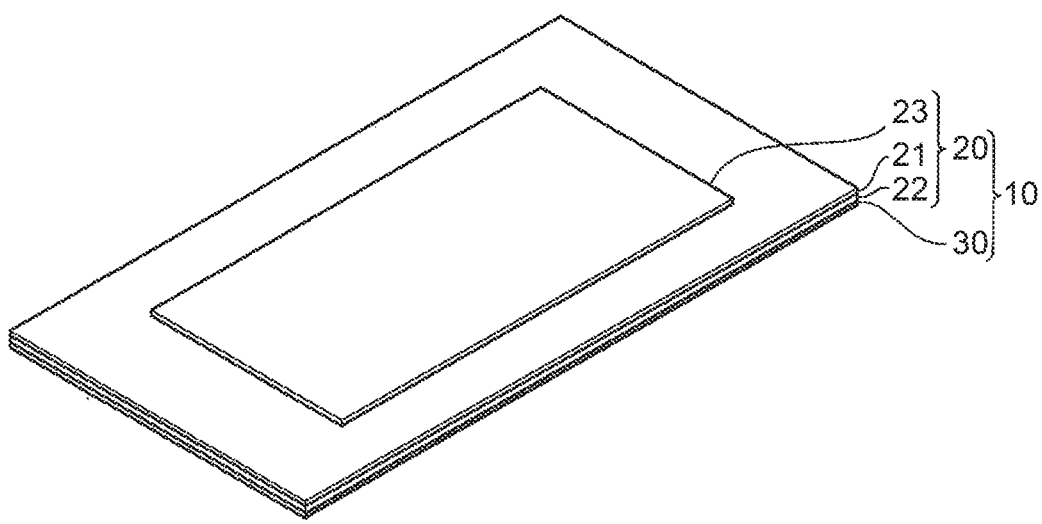
FIG. 1B
CONVENTIONAL
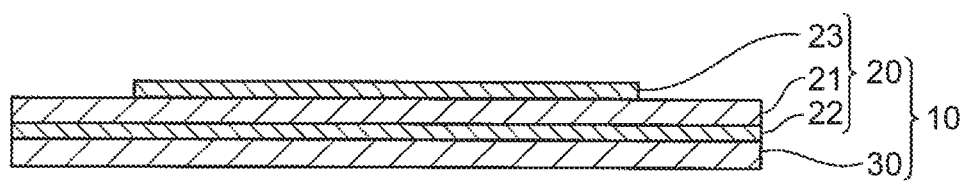

EXAMPLES OF DEFECTIVE CUTTING

BURR (WHISKER)

PEELING (TORN MEMBRANE)

PLAN VIEW OF MEGA

SECTIONAL VIEW OF MEGA

| | | MAXIMUM HOLDING DISTANCE (mm) | | | | | |
|---|---|---|---|---|---|---|---|
| | | 1.5 | 2.0 | 2.5 | 3.0 | 3.5 | 4.0 |
| WORKPIECE THICKNESS (mm) | 0.12 | 12.50 | 16.67 | 20.83 | 25.00 | 29.17 | 33.33 |
| | 0.16 | 9.38 | 12.50 | 15.63 | 18.75 | 21.88 | 25.00 |
| | 0.22 | 6.82 | 9.09 | 11.36 | 13.64 | 15.91 | 18.18 |
| | 0.28 | 5.36 | 7.14 | 8.93 | 10.71 | 12.50 | 14.29 |
| | 0.30 | 5.00 | 6.67 | 8.33 | 10.00 | 11.67 | 13.33 |

| | | MAXIMUM HOLDING DISTANCE (mm) | | | | | |
|---|---|---|---|---|---|---|---|
| | | 1.5 | 2.0 | 2.5 | 3.0 | 3.5 | 4.0 |
| WORKPIECE THICKNESS (mm) | 0.12 | ○ | × | × | × | × | × |
| | 0.16 | ○ | ○ | × | × | × | × |
| | 0.22 | ○ | ○ | ○ | × | × | × |
| | 0.28 | ○ | ○ | ○ | ○ | ○ | × |
| | 0.30 | ○ | ○ | ○ | ○ | ○ | × |

CUTTING APPARATUS FOR MEMBRANE ELECTRODE AND GAS DIFFUSION LAYER ASSEMBLY

INCORPORATION BY REFERENCE

The disclosure of Japanese Patent Application No. 2018-019442 filed on Feb. 6, 2018 including the specification, drawings and abstract is incorporated herein by reference in its entirety.

BACKGROUND

1. Technical Field

The present disclosure relates to a cutting apparatus for a membrane electrode and gas diffusion layer assembly having a workpiece holder.

2. Description of Related Art

As an example of a cutting apparatus for a membrane electrode and gas diffusion layer assembly of this type, an apparatus for cutting a workpiece, including: an upper die composed by a punch; a lower die composed by a die; an upper workpiece holder holding, on the inner side of the upper die, the workpiece formed by a membrane electrode and gas diffusion layer assembly; and a lower workpiece holder holding the workpiece on the outer side of the lower die is disclosed (see Japanese Patent Application Publication No. 2014-37010 (JP 2014-37010 A). As with the cutting apparatus for the membrane electrode and gas diffusion layer assembly described in JP 2014-37010 A, disclosed are a cutting apparatus including: an upper die; a lower die; and a workpiece holder holding a workpiece on the outer side of the lower die (see Japanese Patent Application Publication No. 2013-178993 (JP 2013-178993 A)), and a cutting apparatus including: an upper die composed by a cutting die having an upper blade; and a lower die composed by a receiving die having a lower blade receiver, wherein a part of the workpiece is sheared and elongated by the upper die and the lower die (see Japanese Patent Application Publication No. 2009-208124 (JP 2009-208124 A)).

SUMMARY

However, since the cutting apparatus for the membrane electrode and gas diffusion layer assembly described in JP 2014-37010 A includes: the upper workpiece holder and the lower workpiece holder that hold the workpiece on both sides of the cutting position, it is necessary to once move the upper workpiece holder when the workpiece is taken out after the cutting. Consequently, there is a problem that the minimum time period for one cycle of cutting from the start to the end of the cutting, that is, a so-called cycle time becomes longer. To the contrary, the cutting apparatus for the membrane electrode and gas diffusion layer assembly described in JP 2013-178993 A and the cutting apparatus described in JP 2009-208124 A are each configured such that the workpiece is not sandwiched from above and below, on one side of the cutting position. That is, at the position of the cutting blades where the membrane electrode and gas diffusion layer assembly is cut by the upper die and the lower die, the workpiece is held without providing the workpiece holder on either one side of the upper die and the lower die. Unfortunately, as in the case of the cutting apparatus for the membrane electrode and gas diffusion layer assembly of JP 2013-178993 A and the cutting apparatus described in JP 2009-208124 A, if the workpiece holder on one side is eliminated, there is another problem that burrs are generated on a cut surface when the workpiece is cut.

The present disclosure can be implemented as the following embodiment or application.

A cutting apparatus for a membrane electrode and gas diffusion layer assembly according to the present disclosure, includes: an upper die; a lower die provided with a cutting blade configured to cut a workpiece through shearing by movement in a direction where the lower die moves closer relative to the upper die while the workpiece is interposed between the upper die and the lower die; and a workpiece holder configured to hold and retain the workpiece between the upper die and the workpiece holder by a relative movement of the lower die relative to the upper die, wherein the lower die includes a first outer lateral surface extending in the direction of the relative movement between the upper die and the lower die from the cutting blade, the workpiece holder includes a workpiece holding surface configured to hold the workpiece, an inner lateral surface extending from a first end of a first side of the workpiece holding surface, the first side facing the cutting blade, in the direction of the relative movement between the upper die and the lower die so as to face the first outer lateral surface of the lower die, and a second outer lateral surface extending from a second end of a second side of the workpiece holding surface, the second side further apart from the cutting blade than the first side, in the direction of the relative movement between the upper die and the lower die, and the workpiece holder is arranged such that a workpiece holding distance between the first outer lateral surface of the lower die and the second outer lateral surface of the workpiece holder is 5 times to 12 times a thickness of the workpiece.

The cutting apparatus for the membrane electrode and gas diffusion layer assembly according to the present disclosure is arranged such that the workpiece holding distance between the first outer lateral surface of the lower die and the second outer lateral surface of the workpiece holder is 5 times to 12 times the thickness of the workpiece. According to this configuration, the single workpiece holder sufficiently works, to thereby suppress generation of burrs on the cut surface of the membrane electrode and gas diffusion layer assembly.

According to one aspect of the present disclosure, even in the case in which the workpiece is not sandwiched from above and below on one side of the cutting position of the membrane electrode and gas diffusion layer assembly, it is possible to provide the cutting apparatus for the membrane electrode and gas diffusion layer assembly capable of suppressing generation of burrs on the cut surface.

According to the cutting apparatus of one aspect of the present disclosure, a workpiece holding surface width of the workpiece holding surface may be 1.5 mm or more.

According to the cutting apparatus of one aspect of the present disclosure, when the thickness of the workpiece is 0.12 mm to 0.30 mm, the workpiece holding surface width may be 1.5 mm or more. According to this configuration, when the workpiece holding distance is 1.5 mm and the thickness of the workpiece is 0.3 mm, the minimum multiple, that is, the workpiece holding distance/workpiece thickness of five can be obtained, and thus it is possible to set the workpiece holding surface width of the workpiece holder to be 1.5 mm or more, which enables secure holding of the workpiece.

According to one aspect of the present disclosure, the lower die may include a base and a projection projecting from the base. The upper die may include an opening configured to be opened such that the projection enters into the opening, and the opening may be defined by an inner lateral surface of the upper die. The cutting blade of the lower die and the first outer lateral surface face the inner lateral surface of the upper die when the projection enters into the opening. The workpiece holder may include: a workpiece holder body having the workpiece holding surface, the inner lateral surface of the workpiece holder, and the second outer lateral surface, the workpiece holder body surrounding the first outer lateral surface; and an elastic member interposed between the workpiece holder body and the base.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1A is a perspective view of a membrane electrode and gas diffusion layer assembly according to an embodiment of the present disclosure;

FIG. 1B is a sectional view of the membrane electrode and gas diffusion layer assembly;

DETAILED DESCRIPTION OF EMBODIMENTS

Figure 2A:
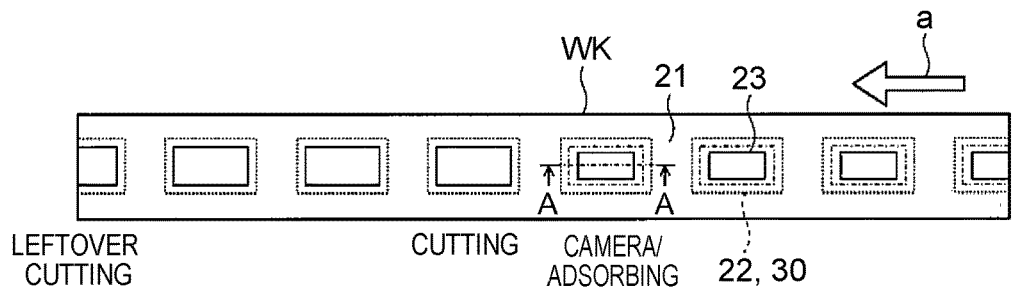
FIG. 2A is a plan view of a continuous sheet of a workpiece being conveyed by a cutting apparatus for the membrane electrode and gas diffusion layer assembly according to the embodiment of the present disclosure.

A cutting apparatus 40 for a membrane electrode and gas diffusion layer assembly 10 according to an embodiment to which a cutting apparatus for a membrane electrode and gas diffusion layer assembly according to the present disclosure is applied will be described with reference to the drawings. Description will be started with the configuration of the membrane electrode and gas diffusion layer assembly 10 according to the embodiment.

As shown in FIG. 1A and FIG. 1B, the membrane electrode and gas diffusion layer assembly (hereinafter, referred to as an MEGA) 10 is formed into a sheet-like shape, and is configured by an assembly formed by joining a membrane electrode assembly (hereinafter, referred to as an MEA) 20 and an anode-side gas diffusion layer (hereinafter, referred to as a GDL) 30.

The MEA 20 includes: an electrolyte membrane 21, an anode catalyst layer 22 laminated on one surface of the electrolyte membrane 21; and a cathode catalyst layer 23 laminated on the other surface thereof.

The electrolyte membrane 21 is formed from a polymer electrolyte resin that is a solid polymer material, such as a perfluorosulfonic acid (PFSA) ionomer, and is formed by an ion-exchange membrane in which a polymer membrane having ion-conductivity is used as its electrolyte. The electrolyte membrane 21 has a function to prevent flows of electrons and gas, and move protons from the anode catalyst layer 22 to the cathode catalyst layer 23.

The anode catalyst layer 22 is formed by an electrode catalyst layer that includes an electric conductive carrier supporting a catalyst, such as platinum and a platinum alloy, and is formed by coating carbon particles, such as catalyst-supporting carbon particles with an ionomer having proton-conductivity. The ionomer is formed from a polymer electrolyte resin that is a solid polymer material, such as a fluorine-based resin, which is homogeneous to the electrolyte membrane 21, and has proton-conductivity due to an ion exchange group contained in the ionomer. The anode catalyst layer 22 has a function to decompose a hydrogen gas into protons and electrons.

The cathode catalyst layer 23 is formed from the same material as that of the anode catalyst layer 22, but has a function to generate water from protons, electrons, and oxygen, which is different from the anode catalyst layer 22.

An anode-side GDL 30 is formed from a material having gas permeability and electric conductivity, for example, a porous fiber base material, such as carbon fibers like carbon paper and graphitic fibers. The anode-side GDL 30 is joined to an outer side of the anode catalyst layer 22, and has a function to uniformly diffuse a hydrogen (H) gas to disperse this gas across the anode catalyst layer 22. Instead of the anode-side GDL 30 joined to the anode catalyst layer 22 side, a cathode-side GDL joined to the cathode catalyst layer 23 side may be used. The cathode-side GDL is configured in the same manner as that of the anode-side GDL 30.

Next, the cutting apparatus 40 for the MEGA 10 according to the embodiment will be described with reference to the drawings.

Figure 2B:
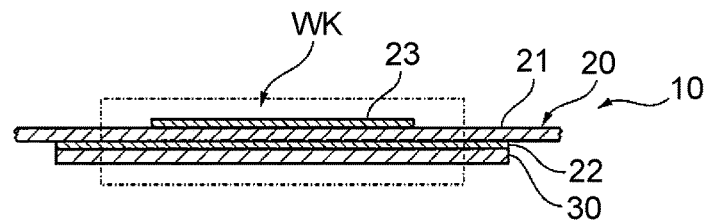
FIG. 2B is an enlarged sectional view taken along line A-A of FIG. 2A.
Figure 2C:
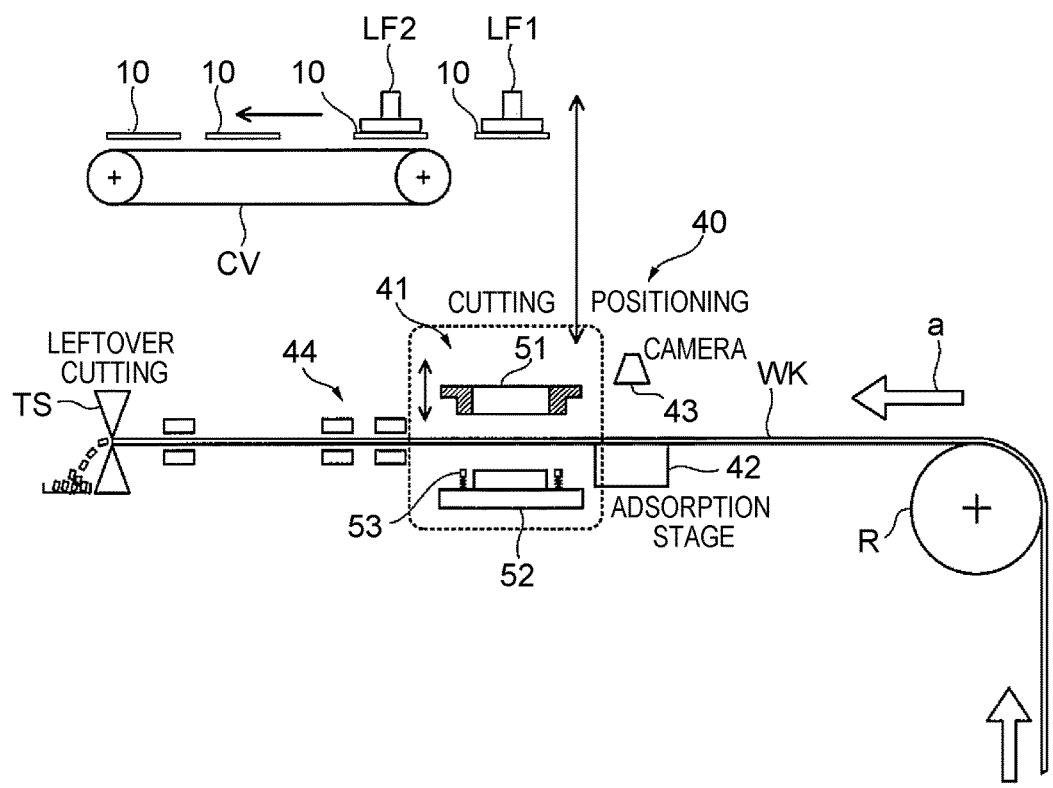
FIG. 2C is a schematic view of a configuration of the cutting apparatus.

As shown in FIG. 2A, FIG. 2C, the cutting apparatus 40 includes: a cutting mechanism 41, an adsorption stage 42, a camera 43, a conveyance mechanism 44 conveying a workpiece WK, and a not-shown controller controlling operations of various component elements. The workpiece WK is formed by a continuous sheet configuring the MEGA 10. The cutting apparatus 40 has a configuration to cut out a MEGA 10 of interest into a sheet-like shape as shown in FIG. 1A from the workpiece WK by the cutting mechanism 41, move the MEGA 10 from the cutting mechanism 41 to a conveyer CV by a lift LF1, and place the MEGA 10 on the conveyer CV by a lift LF2 to convey this to a subsequent step.

Figure 3A:
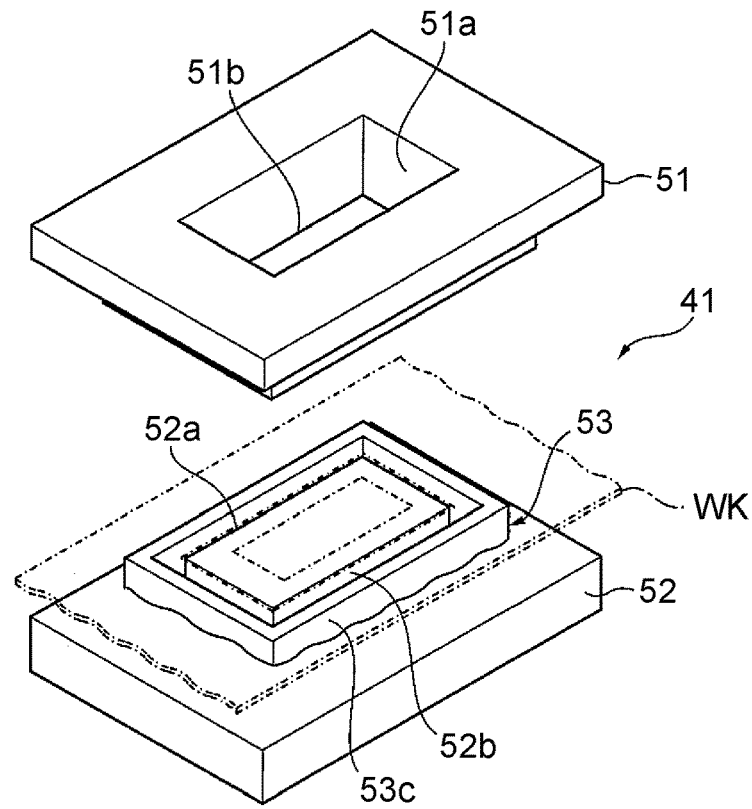
FIG. 3A is an exploded perspective view of a cutting mechanism of the cutting apparatus for the membrane electrode and gas diffusion layer assembly according to the embodiment of the present disclosure.
Figure 3B:
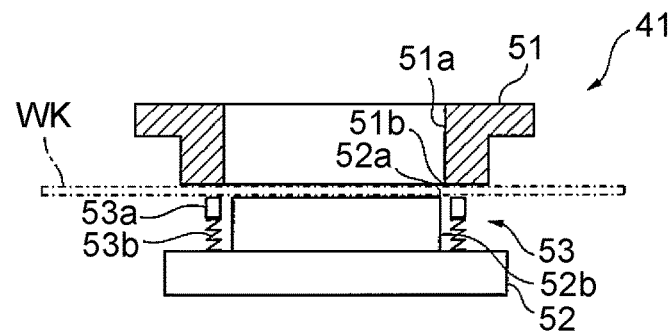
FIG. 3B is a sectional view of the cutting mechanism.
Figure 3C:
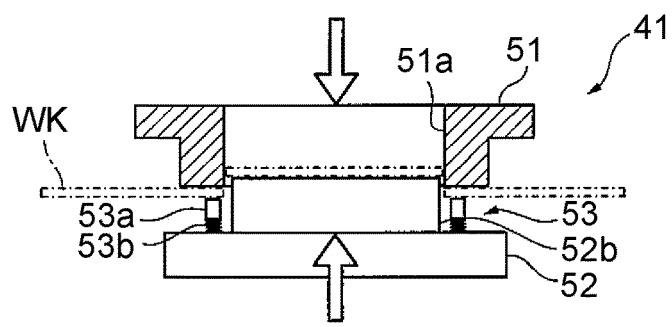
FIG. 3C is a sectional view of the cutting mechanism in a state in which a workpiece is cut.

As shown in FIG. 3A, FIG. 3B, the cutting mechanism 41 includes: an upper die 51; a lower die 52; a workpiece holder 53; a not-shown upper-die lifting mechanism to move the upper die 51 upward and downward; and a not-shown lower-die lifting mechanism to move the lower die 52 upward and downward, and respective operations of these mechanisms are controlled by the controller.

The upper die 51 and the lower die 52 respectively serve as a die and a punch that move in the up-down direction such that they move closer relative to each other with the workpiece WK held therebetween so as to punch the workpiece WK through shearing, to thereby cut out the MEGA 10 from the workpiece WK.

The upper die 51 includes a rectangular opening 51a located in the center of the upper die 51 to allow the lower die 52 to enter, and a cutting blade 51b formed to a lower end of the opening 51a. The opening 51a is formed in substantially the same dimension as that of the outer shape for the MEGA 10 shown in FIG. 1A. The opening 51a is defined by an inner circumferential surface of the upper die 51. The lower die 52 has a projecting shape projecting in a slightly smaller dimension than that of the opening 51a of the upper die 51. That is, the lower die 52 is configured to include a base and a projection projecting from the base. The lower die 52 includes: a cutting blade 52a to face the opening 51a of the upper die 51 with a predetermined clearance relative to the opening 51a when the lower die 52 moves in a direction of moving closer relative to the upper die 51 and enters the opening 51a; and a first outer lateral surface 52b vertically extending downward from the cutting blade 52a so as to face the opening 51a. Note that the first outer lateral surface 52b is an outer lateral surface of the projection of the lower die 52.

The lower die 52 of the cutting apparatus 40 for the MEGA 10 according to the present embodiment configures a predetermined cutting die of the cutting apparatus for the MEGA 10 according to the present disclosure. A portion defined by the cutting blade 51b and the cutting blade 52a of the cutting apparatus 40 for the MEGA 10 according to the present embodiment configures a cutting position of the cutting apparatus for the MEGA 10 according to the present disclosure.

The workpiece holder 53 is provided on the lower die 52, and thus the workpiece holder 53 relatively moves along with the lower die 52 in the direction of moving closer relative to the upper die 51, to thereby perform cutting of the workpiece WK by the upper die 51 and the lower die 52 while the workpiece WK is held and retained between the workpiece holder 53 and the lower surface of the upper die 51. The workpiece holder 53 includes a workpiece holder body 53a that surrounds the whole circumference of the lower die 52 with a constant distance relative to the lower die 52, and an elastic member 53b interposed between the workpiece holder body 53a and the lower die 52. That is, the workpiece holder body 53a surrounds the first outer lateral surface 52b of the lower die 52 and the elastic member 53b is interposed between the workpiece holder body (53a) and the base of the lower die 52. The workpiece holder body 53a is configured to hold the workpiece WK with predetermined elasticity generated by the elastic member 53b being contracted when the workpiece WK is cut by the upper die 51 and the lower die 52, and then return to its original position when the cutting is over.

Figure 4A:
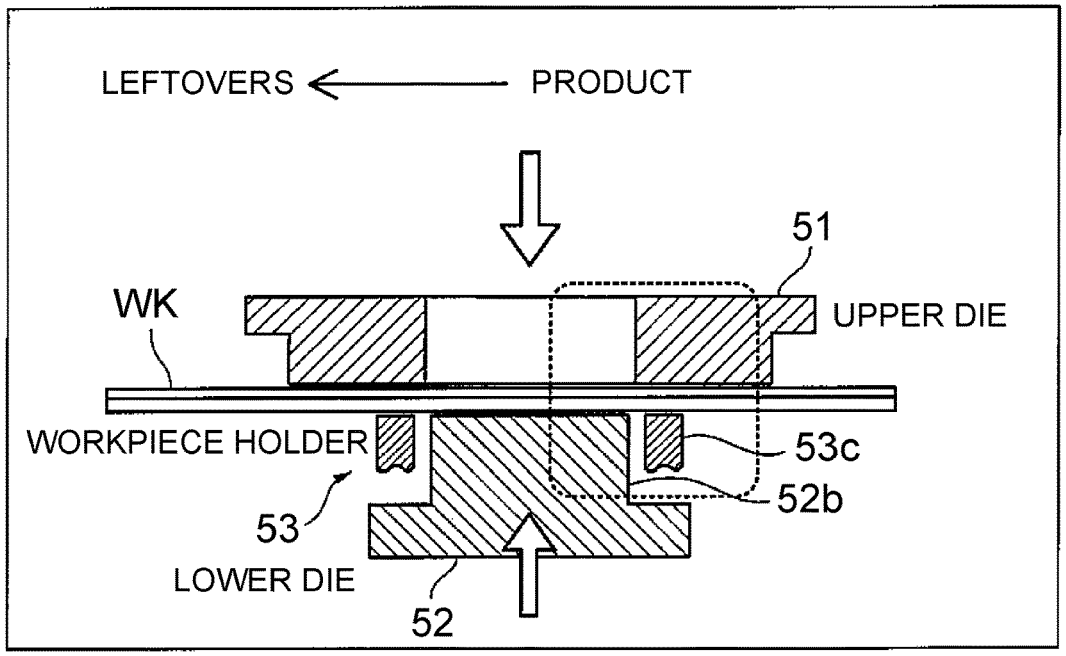
FIG. 4A is a partially sectional view of the cutting mechanism.
Figure 4B:
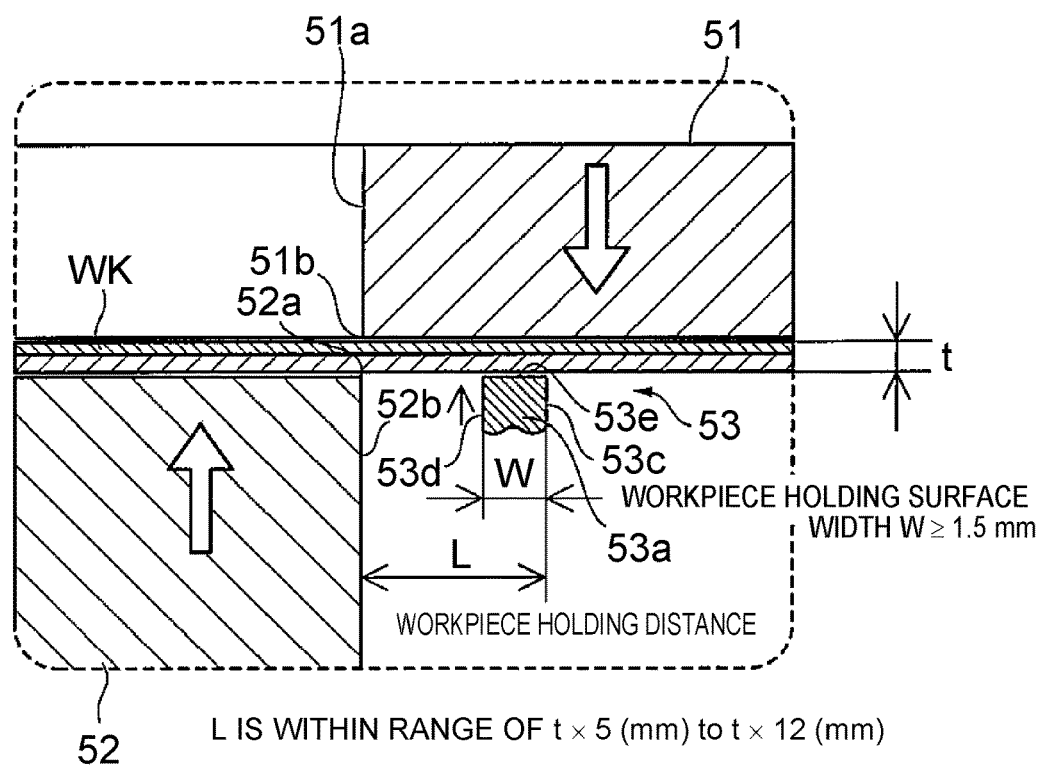
FIG. 4B is a partially enlarged sectional view showing a part of the cutting mechanism of FIG. 4A.

As shown in FIG. 4B, the workpiece holder body 53a includes: a workpiece holding surface 53e facing the lower surface of the upper die 51; an inner lateral surface 53d extending along the up-down direction from an inner end of the workpiece holding surface 53e, which is a first end of a first side facing the cutting blade 52a of the lower die 52, so as to face the first outer lateral surface 52b of the lower die 52; and a second outer lateral surface 53c extending along the up-down direction from an outer end of the workpiece holding surface 53e, which is a second end of a second side further apart from the cutting blade 52a of the lower die 52 than the first side.

As shown in FIG. 4B, the workpiece holder 53 is arranged in the cutting mechanism 41 such that a workpiece holding distance L (mm) between the second outer lateral surface 53c of the workpiece holder 53 and the first outer lateral surface 52b of the lower die 52 is within a range of not less than 5 times to not more than 12 times a thickness t (mm) of the workpiece WK. The workpiece holder 53 is formed such that a workpiece holding surface width W of the workpiece holding surface 53e is 1.5 mm or more (w 1.5 mm). Note that if the workpiece holding surface width W is 1.5 mm or more, it is possible to secure the holding of the workpiece WK.

The adsorption stage 42 shown in FIG. 2C is provided upstream of the cutting mechanism 41 when the adsorption stage 42 is seen in the conveyance direction of the workpiece WK as indicated by an arrow a, and is configured to adsorb and hold the workpiece WK being conveyed for a predetermined time. The adsorption stage 42 includes a well-known adsorption mechanism, such as an air cylinder activated by air pressure, and adsorbing operation is controlled by the above-described controller.

As shown in FIG. 2A, FIG. 2B, in the workpiece WK formed by the continuous sheet, the continuous sheet includes the electrolyte membrane 21, and each cathode catalyst layer 23 indicated by a rectangular solid line in FIG. 2A is formed on the front surface of the electrolyte membrane 21, and each anode catalyst layer 22 and each anode-side GDL 30 indicated by a rectangular broken line in FIG. 2A are formed on the back surface of the electrolyte membrane 21. A one dot chain line illustrated between the broken line and the solid line indicates an outer shape to be cut by the cutting mechanism 41.

The camera 43 shown in FIG. 2C is configured by an image pick-up device, such as a well-known CCD (charge-coupled device) image sensor and a CMOS (complementary metal-oxide-semiconductor) image sensor. The camera 43 is configured to image an exposure surface of the workpiece WK being conveyed continuously or with predetermined time intervals depending on the conveyance speed, and send image data to the controller. The camera 43 has a positioning function to determine timing of the cutting operation by the cutting mechanism 41 as well as a cutting position in the conveyance direction of the workpiece WK by imaging every cathode catalyst layer 23 of the workpiece WK being conveyed, and then sending the image data to the controller.

The controller detects the conveyance direction of every cathode catalyst layer 23 as well as the lateral position and posture in a direction orthogonal to the conveyance direction of the cathode catalyst layer 23 based on the image data sent by the camera 43, so as to determine the position of the cathode catalyst layer 23, and also determine whether or not there are any defective portions on surfaces of the electrolyte membrane 21 and the cathode catalyst layer 23. If the controller determines that there is any defective portion on the surfaces, the controller controls the cutting mechanism 41 to pass them without performing the cutting; on the other hand; and if the controller determines that there is no defective portions on the surfaces, the controller controls the cutting mechanism 41 to perform the cutting operation at a predetermined timing.

As shown in FIG. 2C, the conveyance mechanism 44 is provided downstream of the cutting mechanism 41 in the conveyance direction of the workpiece WK, and is configured to convey the workpiece WK at a predetermined conveyance speed, and stop the conveyance for a predetermined time while the workpiece WK is being cut, based on the command from the controller.

A leftover cutting device TS is provided downstream of the conveyance mechanism 44 in the conveyance direction of the workpiece WK. The leftover cutting device TS is configured to cut, in pieces, leftovers of the workpiece WK, which is a remaining continuous sheet after being cut by the cutting mechanism 41, and collect them.

The operation of the cutting apparatus 40 for the MEGA 10 according to the embodiment will be briefly described as follows.

As shown in FIG. 2C, when the workpiece WK formed by the continuous sheet is fed out from a roll around which the workpiece WK is wound, the workpiece WK is conveyed by the conveyance mechanism 44 via rollers R in a direction indicated by an arrow a. During the conveyance of the workpiece WK, the respective surfaces of the electrolyte membrane 21 and every cathode catalyst layer 23 that are exposed are imaged by the camera 43, and image data thereof are sent to the controller.

The controller determines whether or not the electrolyte membrane 21 and every cathode catalyst layer 23 are properly produced based on the image data. If the electrolyte membrane 21 and the cathode catalyst layer 23 of interest are determined to be defective, the workpiece WK is conveyed as it is without being cut, and thus passes through the cutting mechanism 41. If the controller does not determine that the electrolyte membrane 21 and the cathode catalyst layer 23 of interest are defective, control contents, such as positions in the conveyance direction and the cutting timing, are sent to the cutting mechanism 41, the adsorption stage 42, the conveyance mechanism 44, and others. When the workpiece WK is adsorbed by the adsorption stage 42 at a predetermined timing, the conveyance by the conveyance mechanism 44 is stopped at the same time, and the workpiece WK is then cut by the cutting mechanism 41, and is placed on the conveyer CV and conveyed to the subsequent step by the lift LF1 and the lift LF2.

When the cutting is over, the conveyance by the conveyance mechanism 44 is resumed, and leftovers of the workpiece WK after being cut are further conveyed, and then are cut and collected by the leftover cutting device TS. The workpiece WK is sequentially cut by the cutting mechanism 41, and after the final cutting of the workpiece WK is carried out by the cutting apparatus 40, the operation of the cutting apparatus 40 is completed.

EXAMPLES

Hereinafter, the workpiece WK according to the embodiment was produced, was cut by the cutting apparatus 40 for the MEGA 10 according to the embodiment; and then it was verified whether or not cutting precision can be secured if the workpiece holding distance L (mm) was within a range of not less than 5 times to not more than 12 times the thickness t (mm) of the workpiece WK.

Specifically, each workpiece WK according to the embodiment was configured by the assembly shown in FIG. 2A and FIG. 2B including: the MEA 20 formed by the electrolyte membrane 21, the anode catalyst layer 22, and the cathode catalyst layer 23; and the anode-side GDL 30, and then there were produced five kinds of workpieces WK having thicknesses t (mm) of 0.12 mm, 0.16 mm, 0.22 mm. 0.28 mm, 0.30 mm, respectively.

In addition, there was produced each workpiece WK while the workpiece holding surface width W of the workpiece holder 53 in the cutting mechanism 41 according to the embodiment was set to be 1.5 mm; and the lower die 52 and the workpiece holder 53 were variously arranged so as to have six different workpiece holding distances L (maximum holding distances) (mm) of 1.5 mm, 2.0 mm, 2.5 mm, 3.0 mm, 3.5 mm, and 4.0 mm, wherein the workpiece holding distance L was defined between the first outer lateral surface 52b of the lower die 52 and the second outer lateral surface 53c of the workpiece holder 53. Note that since each workpiece WK was produced with the workpiece holding surface width W of the workpiece holder 53 of 1.5 mm, in the case of the workpiece holding distance L of 1.5 mm, the workpiece holding distance L was slightly greater than 1.5 mm for the sake of avoiding a contact between the workpiece holder 53 and the cutting blade 52a of the workpiece holder 53.

Figures 6A, 6B, 6C:
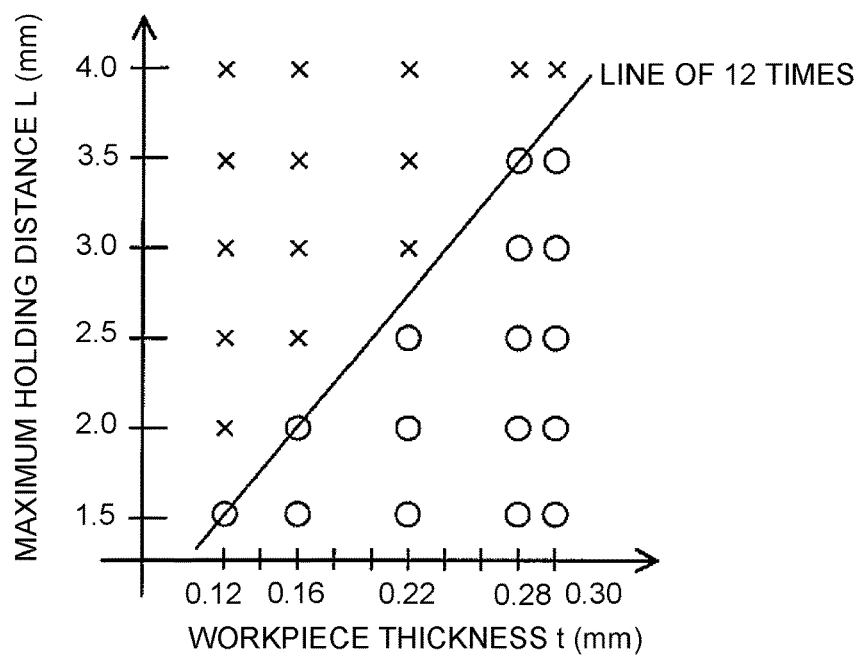
FIG. 6A is a table showing ratios between various workpiece thicknesses and various maximum holding distances in the cutting device for the membrane electrode and gas diffusion layer assembly according to the embodiment of the present disclosure.
FIG. 6B is a graph showing qualities of workpiece cut surfaces with various workpiece thicknesses and various maximum holding distances.
FIG. 6C is a table showing qualities of workpiece cut surfaces with various workpiece thicknesses and various maximum holding distances.

With respect to thirty Examples as configured above, an appearance inspection was conducted on every Example to determine its quality in shape, particularly in shape of the cut surface of the MEGA 10 produced in an actual cutting process. As shown in FIG. 6A, the respective thirty Examples of the MEGAs 10 are shown in corresponding cells of the table, in terms of multiples of the workpiece holding distances L relative to the thicknesses t of the workpieces WK. For instance, the workpiece WK in combination of the thickness t of 0.12 mm and the workpiece holding distance L of 1.5 mm is represented as 12.50. This multiple is found from L/t=1.5/0.12=12.50. The other combinations are calculated and shown in the corresponding cells of the table in the same manner.

Figure 5:
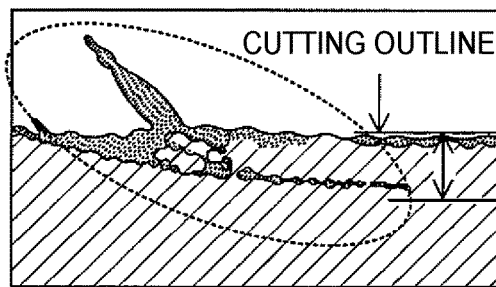
FIG. 5 is an enlarged sectional view of the membrane electrode and gas diffusion layer assembly cut by the cutting apparatus for the membrane electrode and gas diffusion layer assembly according to the embodiment of the present disclosure.
Figure 5:
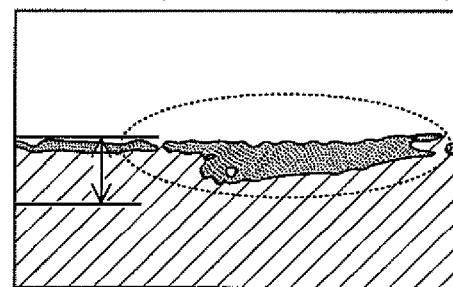
Figure 5:
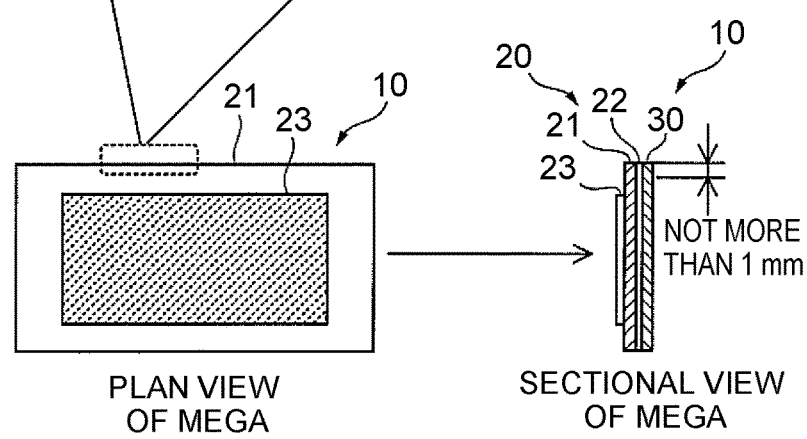

As shown in FIG. 5, the appearance inspection was conducted based on the determination of whether or not any defects, such as burrs, whiskers, peelings or torn membranes, are generated within a range of not more than 1 mm from an outline of the cutting. Examples having such defects are indicated as defective products and plotted by using marks "x" in the graph of FIG. 6B, and also shown in corresponding cells of the table of FIG. 6C. Examples having no defects are indicated as proper products and plotted by using marks "o" in the graph, and also shown in corresponding cells of the table.

As shown in FIG. 6B, results of the appearance inspection on the MEGAs 10 after being cut were as follows: among Examples with the thickness t of the workpiece WK of 0.12 mm, one having the maximum workpiece holding distance L of 1.5 mm exhibited "o"; and those having L of 2.0 mm or more all exhibited "x". Among Examples with t of 0.16 mm, those having L of 1.5 mm and L of 2.0 exhibited "o", and those having L of 2.5 mm or more all exhibited "x". Among Examples with t of 0.22 mm, those having L of 2.5 mm or less exhibited "o", and those having L of 3.0 mm or more all exhibited "x". Among Examples with t of 0.28 mm, those having L of 3.5 mm or less exhibited "o", and one having L of 4.0 mm exhibited "x". Among Examples with t of 0.30 mm, those having L of 3.5 mm or less exhibited "o", and one having L of 4.0 mm exhibited "x". Note that FIG. 6C is the table showing the same results as those of FIG. 6B.

As shown in FIG. 6B, FIG. 6C, it is verified that the results of the appearance inspection fall into proper ones or defective ones, having a boundary value where L/t is 12.5. That is, as shown by an inclined line in FIG. 6B, it is verified that if L/t is within a range of 12 times, the cutting result of interest is proper. In general, the workpiece WK is produced at the thickness t within a range of not less than 0.12 mm to not more than 0.30 mm; therefore, in the present embodiment, as the thickness t of the workpiece WK, five thicknesses were selected within a range of not less than 0.12 mm to not more than 0.30 mm.

Accordingly, as shown in FIG. 6A, within the above range, when the workpiece holding distance L is 1.5 mm and the thickness t of the workpiece WK is 0.3 mm, L/t=5 times that is the minimum multiple can be obtained. By setting the minimum multiple to be 5 times, the workpiece holding surface width W of the workpiece holder 53 can be set to be 1.5 mm or more, to thereby securely hold the workpiece WK. The multiple of L/t in the cutting apparatus 40 for the MEGA 10 according to the present embodiment is set to be within a range of not less than 5 times to not more than 12 times. Within this multiple range, the workpiece holding surface width W of the workpiece holder 53 can be secured, and precision of the cutting thus can be secured.

Advantageous effects of the above-configured cutting apparatus 40 for the MEGA 10 according to the embodiment will be described.

The workpiece holder 53 of the cutting apparatus 40 for the MEGA 10 according to the present embodiment is arranged such that the workpiece holding distance L between the first outer lateral surface 52b of the lower die 52 and the second outer lateral surface 53c of the workpiece holder 53 is not less than 5 times but not more than 12 times the thickness t of the workpiece WK. As a result, the cutting apparatus 40 is configured such that the workpiece holder 53 is not sandwiched from above and below on one side of the cutting position of the MEGA 10, that is, configured such that the workpiece WK is not held between the lower die 52 and an upper workpiece holder, in other words, the workpiece holder 53 is arranged around the lower die 52, and the upper die 51 is provided with no workpiece holder. With this configuration, it is possible to attain such effects that allow the single workpiece holder 53 to sufficiently work, and suppress generation of burrs in the cut surface of the MEGA 10.

Figure 7A:
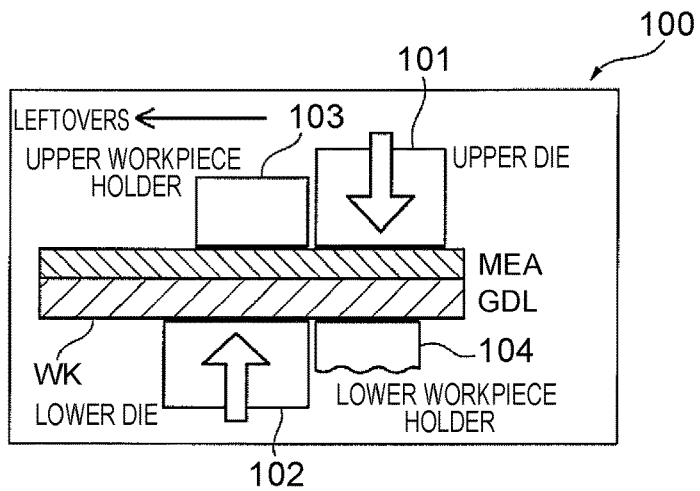
FIG. 7A is a partial sectional view of a conventional cutting apparatus for a membrane electrode and gas diffusion layer assembly.

The cutting apparatus 40 for the MEGA 10 according to the present embodiment can solve problems in a conventional cutting apparatus for the MEGA. That is, as shown in FIG. 7A, a conventional cutting apparatus 100 for the MEGA includes an upper die 101 for cutting the workpiece WK of the MEGA including an MEA and a GDL, a lower die 102, an upper workpiece holder 103, and a lower workpiece holder 104.

Figure 7B:
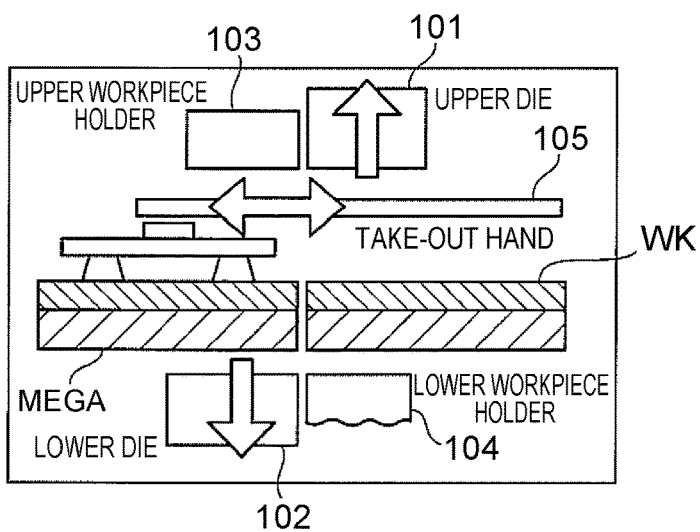
FIG. 7B is a view showing a state in which a take-out hand enters into the cutting apparatus.
Figure 7C:
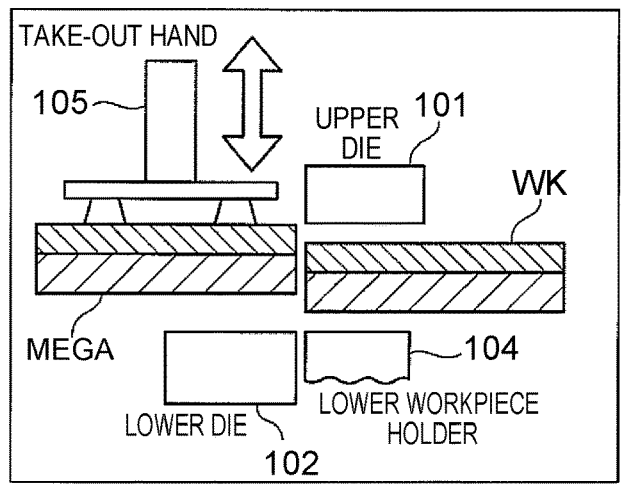
FIG. 7C is a view showing a state in which the workpiece is taken out by the take-out hand.

With this configuration, when the workpiece WK is cut by the conventional cutting apparatus 100, to thereby cut out the sheet-like MEGA, the upper die 101 and the upper workpiece holder 103 move upward, as shown in FIG. 7B. A take-out hand 105 for taking out the MEGA enters between the MEGA and the upper die 101 as well as the upper workpiece holder 103 from a lateral side in the drawing, and then adsorbs the MEGA. Subsequently, as shown in FIG. 7C, the take-out hand 105 moves upward to send the MEGA to a subsequent step.

In this manner, the conventional cutting apparatus for the MEGA is configured to hold the workpiece WK by the upper workpiece holder 103 and the lower workpiece holder 104; therefore, when the MEGA is taken out after the cutting, it is necessary to once move the upper workpiece holder 103. Consequently, there is a problem that the minimum time period for one cycle from the start to the end of the cutting, that is, the cycle time of the cutting becomes longer. In order to solve this problem, it is necessary to eliminate the upper workpiece holder 103 and provide a space for taking out the MEGA. However, if the upper workpiece holder 103 is eliminated, such a contradiction that easily generates burrs on the cut surface is raised. Generation of burrs on the cut surface results from elongation of the MEGA due to the shearing force, so that the cutting shape becomes ununiform.

The cutting apparatus 40 for the MEGA 10 according to the present embodiment is configured such that the workpiece holder 53 is arranged to be not sandwiched from above and below on one side of the cutting position of the MEGA 10. That is, it is structured that the workpiece holder 53 is arranged around the lower die 52, and the upper die 51 is provided with no workpiece holder. Even if the upper die 51 is provided with no workpiece holder, it is possible to suppress generation of burrs as well as secure a high cutting precision as aforementioned. Therefore, the cutting apparatus 40 for the MEGA 10 according to the present embodiment can attain such an effect that solves the problem in the conventional cutting apparatus for the MEGA, that is, the cycle time of the cutting becomes longer.

As aforementioned, the detailed description has been provided on the embodiment of the present disclosure, and the present disclosure is not limited to the above-described embodiment and may include various changes and modifications in designing without departing from the spirit of the present disclosure recited in the claims.

What is claimed is:

1. A cutting apparatus for a membrane electrode and gas diffusion layer assembly included in a fuel cell, the cutting apparatus comprising:
   an upper die provided with a cutting blade;
   a lower die provided with a cutting blade configured to cut a workpiece through shearing by movement in a direction where the lower die moves closer relative to the upper die while the workpiece is interposed between the upper die and the lower die; and
   a workpiece holder configured to hold and retain the workpiece between the upper die and the workpiece holder by a relative movement of the lower die relative to the upper die,
   wherein
   the lower die includes a first outer lateral surface extending in the direction of the relative movement between the upper die and the lower die from the cutting blade,
   the workpiece holder includes a workpiece holding surface spaced apart from the first outer lateral surface of the lower die and configured to hold the workpiece, an inner lateral surface extending from a first end of a first side of the workpiece holding surface, the first side facing the cutting blade, along the direction of the relative movement between the upper die and the lower die so as to face the first outer lateral surface of the lower die, and a second outer lateral surface extending from a second end of a second side of the workpiece holding surface, the second side further apart from the cutting blade than the first side, along the direction of the relative movement between the upper die and the lower die; and wherein the workpiece holder is arranged to hold the workpiece such that a workpiece holding distance between the first outer lateral surface of the lower die and the second outer lateral surface of the workpiece holder is 5 times to 12 times a predetermined workpiece thickness, the workpiece thickness being at least 0.12 mm; and a workpiece holder is not provided on an upper die side of the workpiece.

2. The cutting apparatus according to claim 1, wherein a workpiece holding surface width of the workpiece holding surface is 1.5 mm or more.

3. The cutting apparatus according to claim 2, wherein when the thickness of the workpiece is 0.12 mm to 0.30 mm, the workpiece holding surface width is 1.5 mm or more.

4. The cutting apparatus according to claim 1, wherein the lower die includes a base and a projection projecting from the base, the upper die includes an opening configured to be opened such that the projection enters into the opening, and the opening is defined by an inner lateral surface of the upper die, the cutting blade of the lower die and the first outer lateral surface face the inner lateral surface of the upper die when the projection enters into the opening, and the workpiece holder includes a workpiece holder body having the workpiece holding surface, the inner lateral surface of the workpiece holder, and the second outer lateral surface, the workpiece holder body surrounding the first outer lateral surface, and an elastic member interposed between the workpiece holder body and the base.

* * * * *